(12) United States Patent
Lee et al.

(10) Patent No.: US 7,777,938 B2
(45) Date of Patent: Aug. 17, 2010

(54) ELECTROPHORETIC DISPLAY UNIT AND DISPLAY DEVICE HAVING THE SAME AND METHOD OF MANUFACTURING THE SAME

(75) Inventors: Jeong-Kuk Lee, Yongin-si (KR); Seok-Joon Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 11/954,643

(22) Filed: Dec. 12, 2007

(65) Prior Publication Data

US 2008/0285114 A1    Nov. 20, 2008

(30) Foreign Application Priority Data

May 14, 2007    (KR) .................. 10-2007-0046462

(51) Int. Cl.
*G02B 26/00* (2006.01)
(52) U.S. Cl. ...................... 359/296; 359/297
(58) Field of Classification Search ............. 359/296, 359/297, 298; 345/107
See application file for complete search history.

(56) References Cited

U.S. PATENT DOCUMENTS

| | | | | |
|---|---|---|---|---|
| 6,417,901 | B1 * | 7/2002 | Okada et al. | 349/113 |
| 6,721,083 | B2 * | 4/2004 | Jacobson et al. | 359/296 |
| 6,750,844 | B2 | 6/2004 | Nakanishi | |
| 6,950,226 | B2 * | 9/2005 | Endo et al. | 359/296 |
| 6,980,351 | B2 * | 12/2005 | Ahn et al. | 359/296 |
| 7,110,163 | B2 | 9/2006 | Webber et al. | |
| 7,233,429 | B2 * | 6/2007 | Liang et al. | 359/296 |
| 7,365,732 | B2 * | 4/2008 | Matsuda et al. | 345/107 |
| 7,492,505 | B2 * | 2/2009 | Liang et al. | 359/296 |
| 7,576,903 | B2 * | 8/2009 | Yamamoto et al. | 359/296 |

FOREIGN PATENT DOCUMENTS

| KR | 20030013374 | 2/2003 |
|---|---|---|
| KR | 1020060030630 | 4/2006 |

* cited by examiner

*Primary Examiner*—Timothy J Thompson
(74) *Attorney, Agent, or Firm*—H.C. Park & Associates, PLC

(57) ABSTRACT

An electrophoretic display unit includes a transparent base film, a transparent electrode disposed on the base film, an electrophoretic display layer disposed on the transparent electrode to display an image in response to an electric field, and an opaque electrophoretic protection layer disposed on the electrophoretic display layer.

11 Claims, 8 Drawing Sheets

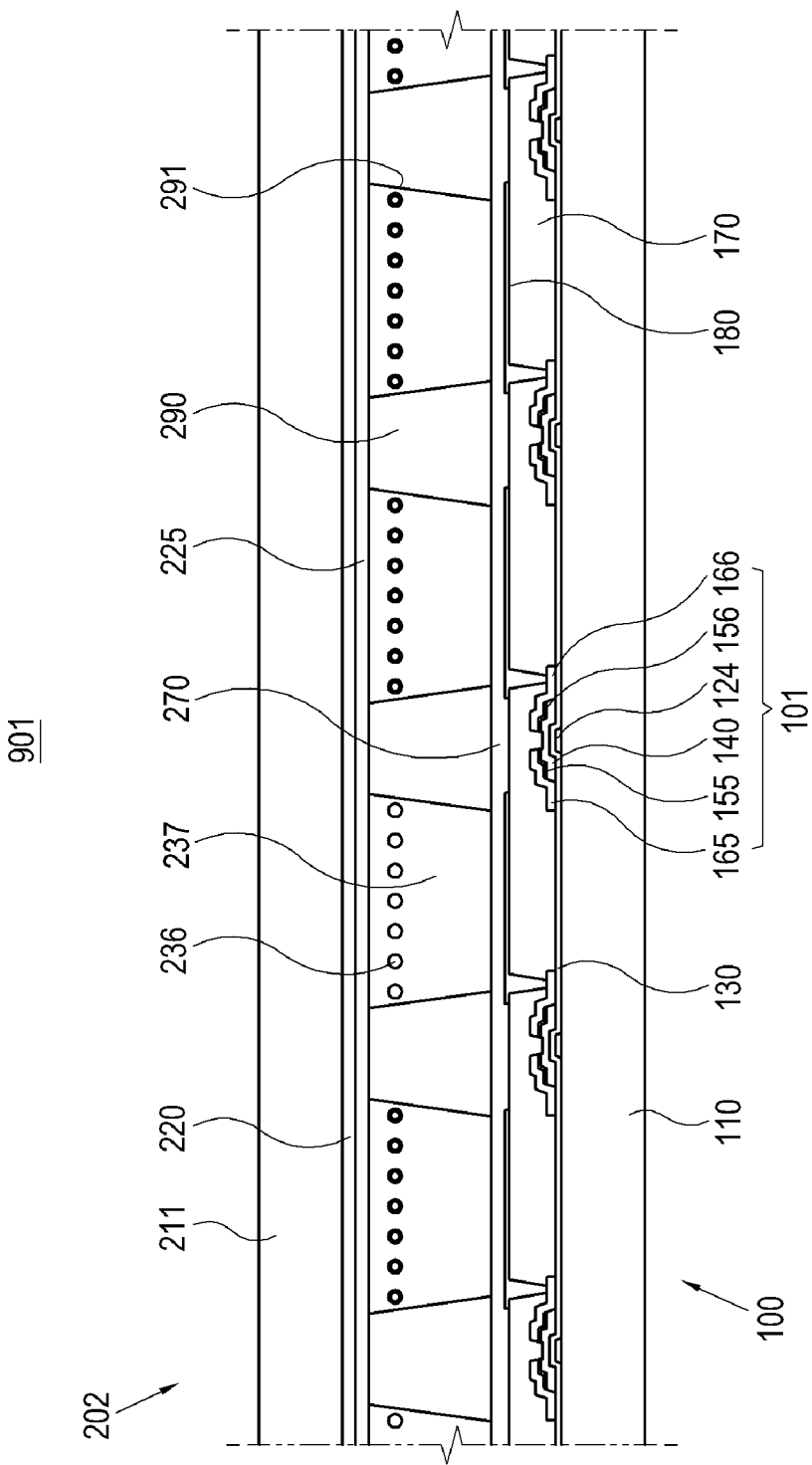

ELECTROPHORETIC DISPLAY UNIT AND DISPLAY DEVICE HAVING THE SAME AND METHOD OF MANUFACTURING THE SAME

CROSS-REFERENCE TO RELATED APPLICATION

This application claims priority from Korean Patent Application No. 10-2007-0046462, filed on May 14, 2007, which is hereby incorporated by reference for all purposes as if fully set forth herein.

BACKGROUND OF THE INVENTION

1. Field of the Invention

The present invention relates to an electrophoretic display unit, a display device having the same, and a method of manufacturing the same. More particularly, the present invention relates to an electrophoretic display unit that may have improved stability, productivity, and display properties, a display device having the same, and a method of manufacturing the same.

2. Discussion of the Background

A display device using electrophoresis may be flexible and relatively thin and lightweight. Thus, the display device may be incorporated into electronic paper or electronic books.

The display device includes a pair of electrodes to form an electric field and an electrophoretic particle disposed between the pair of electrodes. The pair of electrodes includes a pixel electrode connected to a switching element and a transparent electrode to receive a common voltage. The electrophoretic particle is a charged particulate and has a polarity. The display device may adjust the potential difference between the pair of electrodes and move the electrophoretic particle, thereby displaying a desired image thereon.

A display device that uses a dispersion including the charged particulate, i.e. the electrophoretic particle, in a microcapsule has been recently developed. Such a display device may include a driving substrate having a switching element and a pixel electrode, and an electrophoretic substrate having an electrophoretic microcapsule. Generally, the driving substrate and the electrophoretic substrate are separately manufactured and then sealed to each other to form a display device.

However, when the driving substrate is sealed to the electrophoretic substrate, the electrophoretic substrate may be damaged or errors may occur, thereby lowering productivity.

Also, the electrophoretic display device may not easily display the color black. Because the display device reflects external light to display an image, it may not be possible to secure sufficient brightness.

SUMMARY OF THE INVENTION

The present invention provides an electrophoretic display unit that may have improved stability, productivity, and display properties.

The present invention also provides a display device that includes the electrophoretic display unit.

The present invention also provides a method of manufacturing the display device.

Additional features of the invention will be set forth in part in the description which follows, and in part will be apparent from the description, or may be learned by practice of the present invention.

The present invention discloses an electrophoretic display unit including a transparent base film, a transparent electrode disposed on the transparent base film, an electrophoretic display layer disposed on the transparent electrode to display an image in response to an electric field, and an opaque electrophoretic protection layer disposed on the electrophoretic display layer.

The present invention also discloses a display device including a panel unit and an electrophoretic display unit. The panel unit includes a thin film transistor (TFT) and a pixel electrode. The electrophoretic display unit is provided on the panel unit and includes an opaque electrophoretic protection layer disposed on the pixel electrode of the panel unit, an electrophoretic display layer disposed on the opaque electrophoretic protection layer, a transparent electrode disposed on the electrophoretic display layer, and a transparent base film provided on the transparent electrode.

The present invention also discloses a method of manufacturing a display device including providing a panel unit including a thin film transistor (TFT) and a pixel electrode, providing an electrophoretic display unit, and adhering the electrophoretic display unit to the panel unit using a roller. The electrophoretic display unit includes a transparent base film, a transparent electrode disposed on the transparent base film, an electrophoretic display layer disposed on the transparent electrode, and an opaque electrophoretic protection layer disposed on the electrophoretic display layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention, and together with the description serve to explain the principles of the invention.

FIG. 8 is a cross-sectional view of a display device according to a fourth exemplary embodiment of the present invention.

DETAILED DESCRIPTION OF THE ILLUSTRATED EMBODIMENTS

Figure 1:
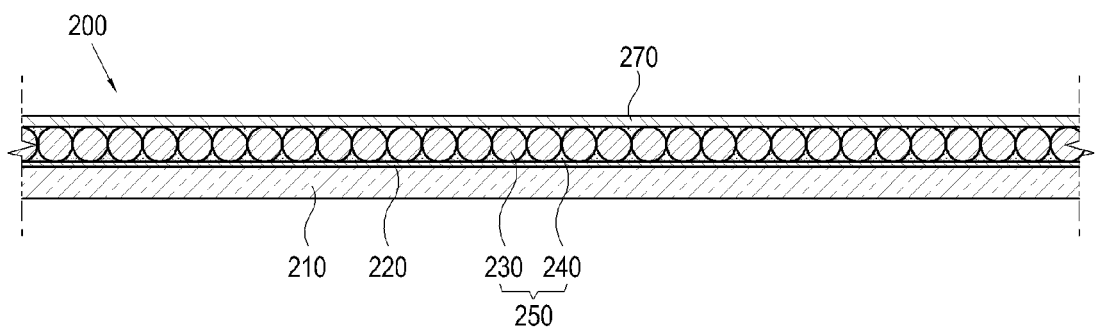
FIG. 1 is a cross-sectional view of an electrophoretic display unit according to a first exemplary embodiment of the present invention.

The invention is described more fully hereinafter with reference to the accompanying drawings, in which embodiments of the invention are shown. The invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element, it can be directly on or directly connected to the other element or layer, or intervening elements or layers may be present. In contrast, when an element is referred to as being "directly on" or "directly connected to" another element or layer, there are no intervening elements or layers present.

FIG. 1 is a cross-sectional view of an electrophoretic display unit 200 according to a first exemplary embodiment of the present invention.

As shown therein, the electrophoretic display unit 200 includes a base film 210, a transparent electrode 220, an electrophoretic display layer 250, and an electrophoretic protection layer 270.

The base film 210 may include a transparent plastic that has good light transmittance. For example, the plastic may include acrylic resin, polyester resin, polyolefin resin, polycarbonate resin, polyimide resin, or polyethyleneterephtalate (PET), which also has good thermal resistance, strength, and electrical properties.

The transparent electrode 220 is formed on the base film 210. The transparent electrode 220 may include an inorganic conductive material, such as indium tin oxide (ITO), indium zinc oxide (IZO), metallic particulates, or an ultra thin metal layer, or an organic conductive material, such as polyacetylene, polyaniline, polypyrrole, polyethylene dioxythiophene (PEDOT), or polythiophene.

The electrophoretic display layer 250 is formed on the transparent electrode 220. The electrophoretic display layer 250 includes a binder 240 and an electrophoretic microcapsule 230 that is mixed with the binder 240. The electrophoretic display layer 250 displays an image generated by the microcapsule 230 through electrophoresis.

The binder 240 adheres the microcapsule 230 to the transparent electrode 220. The binder 240 may protect the microcapsule 230. The binder 240 may include various types of organic binders. The binder 240 may be sufficiently adhesive to adhere the electrophoretic protection layer 270 to the electrophoretic display layer 250.

The electrophoretic protection layer 270 is permanently attached to the electrophoretic display layer 250. The electrophoretic protection layer 270 may include organic or inorganic materials. The electrophoretic protection layer 270 may also include a polymer material so that it is viscoelastic, thereby making the electrophoretic display unit 200 flexible.

The electrophoretic protection layer 270 may be colored and may include a pigment. That is, the electrophoretic protection layer 270 may be opaque and more specifically, may be substantially black. If the electrophoretic protection layer 270 is black, the contrast ratio of an image displayed on the electrophoretic display layer 250 may be improved. To have a black color, the electrophoretic protection layer 270 may include at least one of an inorganic pigment, such as carbon black, titanium black, and iron black, and an organic pigment, such as aniline black.

Alternatively, the electrophoretic protection layer 270 may be substantially white. If the electrophoretic protection layer 270 is white, the brightness of an image displayed on the electrophoretic display layer 250 may be improved. To have a white color, the electrophoretic protection layer 270 may include at least one of titanium dioxide, barium sulfate, zinc oxide, basic lead carbonate, aleurone, mica, and crystal powder.

The electrophoretic protection layer 270 may be formed to substantially cover the entire electrophoretic display layer 250.

With the foregoing configuration, the electrophoretic display unit 200 may have improved stability, productivity, and display properties. That is, the electrophoretic display unit 200 may have improved stability because the electrophoretic display layer 250 is protected by the electrophoretic protection layer 270.

The electrophoretic display unit 200 does not require an additional protection part to protect the electrophoretic display layer 250 and does not need to be reexfoliated, which may improve productivity.

The electrophoretic protection layer 270 may be assigned a particular color, which may improve the quality of an image displayed on the electrophoretic display layer 250.

The electrophoretic display unit 200 reflects external light to display an image. Light that is supplied to the electrophoretic display layer 250 should be mostly reflected by the electrophoretic display layer 250. However, part of the light may pass through the electrophoretic display layer 250. As a result, the quality of the image displayed on the electrophoretic display layer 250 may be lowered.

Thus, the electrophoretic protection layer 270 covering the electrophoretic display layer 250 may be assigned a color to improve the quality of the image displayed on the electrophoretic display layer 250. If the electrophoretic protection layer 270 is black, it absorbs light passing through the electrophoretic display layer 250 and increases the purity of the black color that the electrophoretic display layer 250 may display. Then, the contrast ratio of the image displayed on the electrophoretic display unit 200 may be improved.

If the electrophoretic protection layer 270 is white, it may re-reflect light passing through the electrophoretic display layer 250 and improve the brightness of an image displayed on the electrophoretic display layer 250.

The electrophoretic display unit 200 may be formed to be flexible. Thus, the electrophoretic display unit 200 may be rolled up and moved easily and may be used in electronic paper or electronic books.

Figure 2:
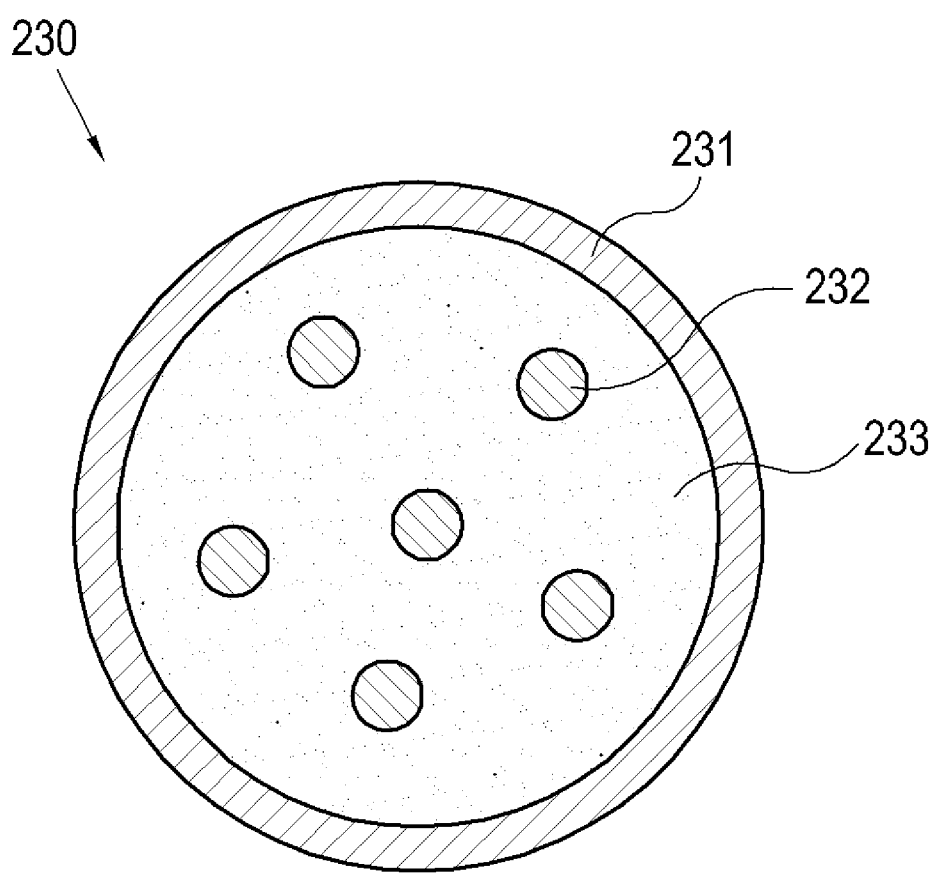
FIG. 2 is an enlarged cross-sectional view of a microcapsule in FIG. 1.

Referring to FIG. 2, the microcapsule 230 of the electrophoretic display layer 250 may be described in detail.

As shown therein, the microcapsule 230 includes a capsule shell 231, an electrophoretic particle 232, and a dispersion medium 233. The electrophoretic particle 232 and the dispersion medium 233 are disposed within the capsule shell 231 As the electrophoretic particle 232 of the microcapsule 230 moves in the dispersion medium 233 in response to an electric field, the electrophoretic display unit 200 displays an image.

The capsule shell 231 according to the first exemplary embodiment of the present invention has a circular shape, but is not limited thereto. Alternatively, the capsule shell 231 may have various shapes including a cylinder shape and a hexahedron shape.

The microcapsule 230 may have an average diameter ranging from 10 μm to 150 μm If the average diameter of the microcapsule 230 is smaller than 10 μm, the electrophoretic display unit 200 may not have a sufficient density of microcapsules 230 to display an image. If the average diameter of the microcapsule 230 is larger than 150 μm, the mechanical strength of the microcapsule 231 may be insufficient and it may be broken.

The electrophoretic particle 232 may include a solid particle that has a positive or negative electric charge and moves up and down in the dispersion media 233 in response to an electric field. The electrophoretic particle 232 may have an average diameter ranging from 0.1 μm to 5 μm. If the electrophoretic particle 232 is smaller than 0.1 μm, chromaticity may not be sufficiently guaranteed. Also, the contrast ratio may be lowered and an image may not be clearly displayed. If the electrophoretic particle 232 is larger than 5 μm, it may move more slowly, which may slow down the response speed.

The dispersion media 233 may include any dispersion media and may be, for example, an organic solvent.

Figure 3:
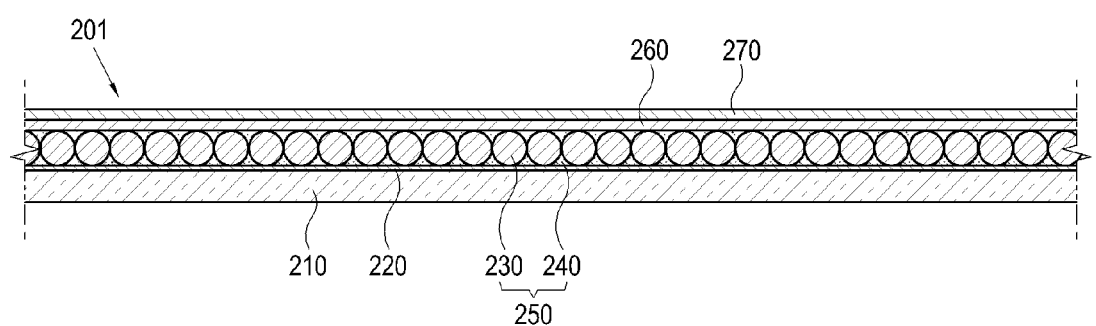
FIG. 3 is a cross-sectional view of an electrophoretic display unit according to a second exemplary embodiment of the present invention.

Referring to FIG. 3, an electrophoretic display unit 201 according to a second exemplary embodiment of the present invention will be described.

As shown therein, the electrophoretic display unit 201 further includes an intermediate adhesive layer 260 disposed between an electrophoretic display layer 250 and an electrophoretic protection layer 270. The intermediate adhesive layer 260 adheres the electrophoretic protection layer 270 to the electrophoretic display layer 250 more firmly.

The intermediate adhesive layer 260 may include a water-soluble resin such as polyester resin, acrylic resin, epoxy resin, urethane resin, oxazoline resin, PVP resin, polyoxyalkylene resin, cellulose resin, or emulsion resin. The intermediate adhesive layer 260 may be formed by various methods.

With the foregoing configuration, an electrophoretic display layer 250 may be more stably protected by the electrophoretic protection layer 270.

Figure 4:
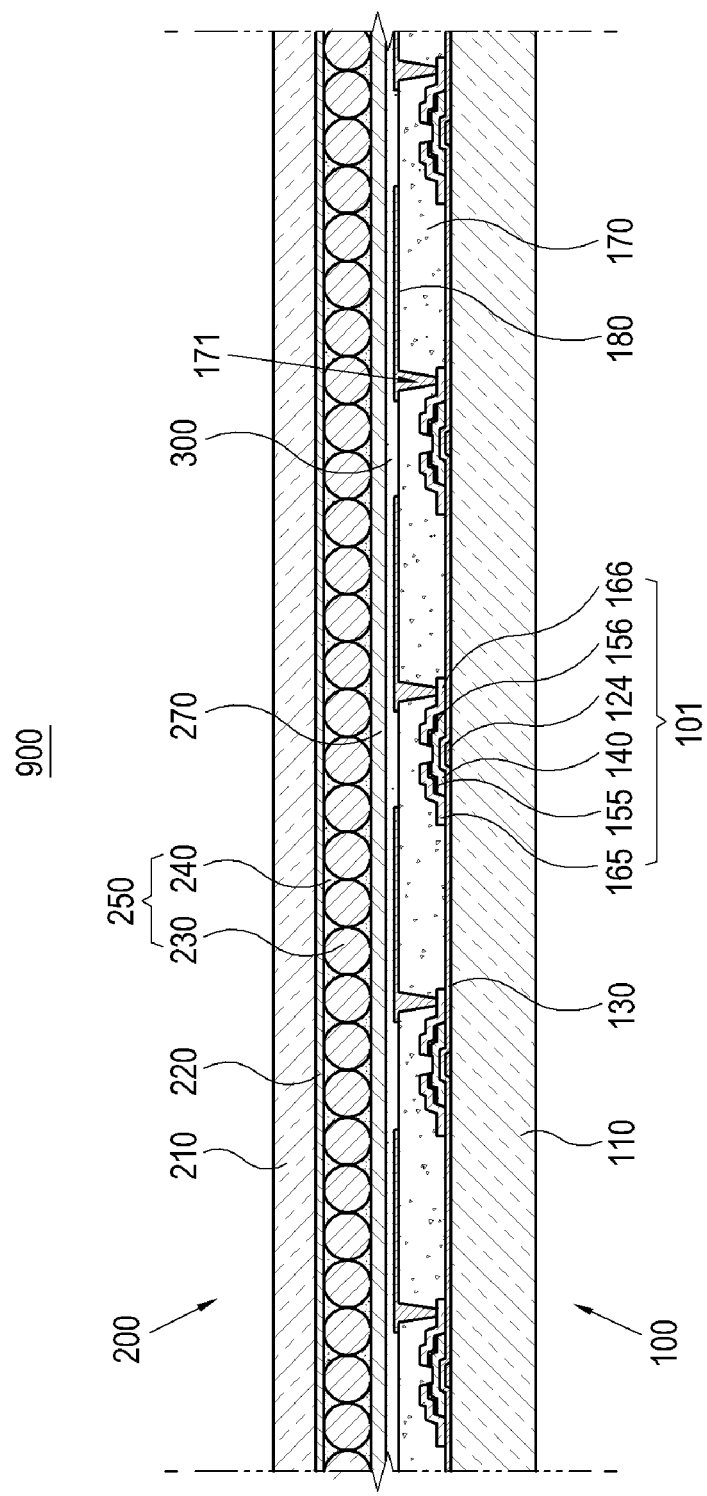
FIG. 4 is a cross-sectional view of a display device according to a third exemplary embodiment of the present invention.

Referring to FIG. 4, a display device 900 according to a third exemplary embodiment of the present invention will be described.

FIG. 4 shows a panel unit 100 which includes an amorphous silicon (a-Si) thin film transistor formed by five mask processes. The present invention may be realized by various kinds of display devices and is not limited to those in the exemplary embodiments.

As shown therein, the display device 900 includes the electrophoretic display unit 200 shown in FIG. 1, a panel unit 100, and an inter-unit adhesive layer 300. The electrophoretic display unit 200 according to the third exemplary embodiment is the same as that in the first exemplary embodiment shown in FIG. 1.

Gate wires that include a plurality of gate electrodes 124 are formed on a substrate member 110. The gate wires may further include a plurality of gate lines connected to the gate electrodes 124 and a plurality of first storage electrode lines. Here, the substrate member 110 may include glass, quartz, ceramic, or plastic. If the substrate member 110 includes a flexible material, the application of the display device 900 may expand.

The gate wires including the gate electrodes 124 may include metal such as Al, Ag, Cr, Ti, Ta, Mo, or an alloy thereof. FIG. 4 shows the gate wires as a single layer. Alternatively, the gate wires may include multiple metal layers such as Cr, Mo, Ti, Ta, or an alloy thereof, which have good physical and chemical properties, and metal layers such as Al series or Ag series, which have small specific resistance. Otherwise, the gate wires may include various metals or conductive materials, and more preferably, multiple layers that can be patterned by the same etching process.

A gate insulating layer 130, which may include silicon nitride (SiNx), is formed on the gate wires.

Data wires 165 and 166 are formed on the gate insulating layer 130. The data wires 165 and 166 include a plurality of source electrodes 165 at least partially overlapping the gate electrodes 124 and a plurality of drain electrodes 166 spaced apart from the source electrodes 165 and at least partially overlapping the gate electrodes 124. The data wires 165 and 166 may further include a plurality of data lines (not shown) perpendicular to the gate lines and a plurality of second storage electrode lines (not shown) that overlaps the first storage electrode lines.

The data wires 165 and 166 may include a conductive material such as Cr, Mo, Al, or an alloy thereof. The data wires 165 and 166 may include a single layer or multiple layers.

A semiconductor layer 140 is formed on the gate insulating layer 130 of the gate electrodes 124. Here, the gate electrodes 124, the source electrodes 165, and the drain electrodes 166 serve as electrodes of a thin film transistor 101. The semiconductor layer 140 formed between the source electrodes 165 and the drain electrodes 166 includes a channel region of the thin film transistor 101.

Ohmic contact layers 155 and 156 are formed between the semiconductor layer 140 and the source electrodes 165 and between the semiconductor layer 140 and the drain electrodes 166, respectively, to reduce contact resistance therebetween. The ohmic contact layers 155 and 156 may include silicide or amorphous silicon highly doped with an n-type dopant.

A passivation layer 170 is formed on the data wires 165 and 166. The passivation layer 170 may include an insulating material with a low permittivity, such as a-Si:C:O or a-Si:O:F formed by a plasma enhanced chemical vapor deposition (PECVD), or an inorganic insulating material, such as silicon nitride or silicon oxide.

A plurality of pixel electrodes 180 is formed on the passivation layer 170. The pixel electrodes 180 include a transparent conductive material, such as indium tin oxide (ITO) or indium zinc oxide (IZO), or an opaque conductive material, such as aluminum.

The passivation layer 170 includes a plurality of contact holes 171 that expose parts of the drain electrodes 166 therethrough. The pixel electrodes 180 are connected to the drain electrodes 166 through the contact holes 171.

The inter-unit adhesive layer 300 adheres the panel unit 100 to the electrophoretic display unit 200. The inter-unit adhesive layer 300 may include water-soluble resin, such as polyester resin, acrylic resin, epoxy resin, urethane resin, oxazoline resin, PVP resin, polyoxyalkylene resin, cellulose resin, or emulsion resin. The unit adhesive layer 300 may be coated by various methods.

The electrophoretic protection layer 270 of the electrophoretic display unit 200 faces the pixel electrodes 180 of the panel unit 100 and the inter-unit adhesive layer 300 is positioned therebetween.

Thus, the electrophoretic display layer 250 displays an image when an electric field is formed between the transparent electrode 220 of the electrophoretic display unit 200 and the pixel electrodes 180 of the panel unit 100.

The electrophoretic display unit 200 may have a thickness ranging from 20 μm to 200 μm. If the electrophoretic display unit 200 is thinner than 20 μm, it may be wrinkled when it is adhered to the panel unit 100. If the electrophoretic display unit 200 is thicker than 200 μm, it may be difficult to roll up and move the electrophoretic display unit 200 and to adhere the electrophoretic display unit 200 to the panel unit 100.

With the foregoing configuration, the display device 900 may have improved stability, productivity, and display properties.

That is, because the display device 900 includes the electrophoretic protection layer 270 that protects the electrophoretic display layer 250, damage to the electrophoretic display layer 250 may be prevented, thereby improving stability.

Also, because the electrophoretic protection layer 270 is assigned a particular color, the quality of an image displayed by the display device 900 may be improved.

Figure 5:
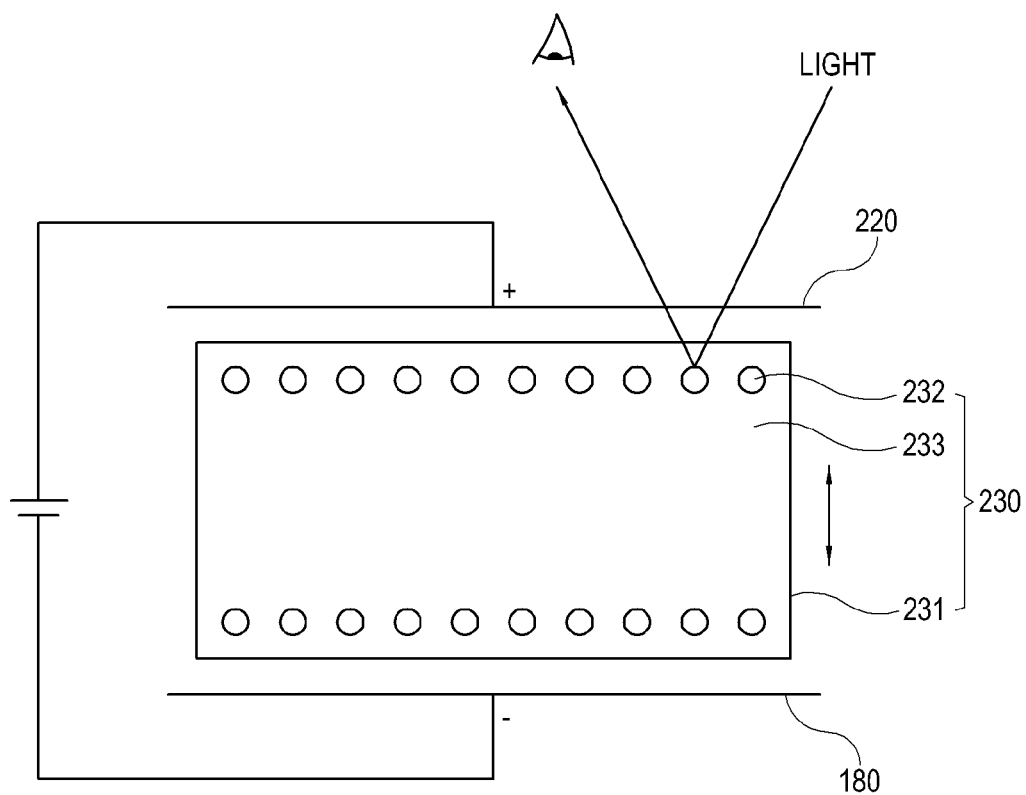
FIG. 5 shows a driving principle of the display device in FIG. 4.

Hereinafter, a driving principle of the display device 900 using electrophoresis will be described in detail with reference to FIG. 5.

As shown therein, the display device 900 includes a pair of electrodes 180 and 220 to form an electric field. One of the electrodes is a pixel electrode 180 and the other is a transparent electrode 220 that receives a common voltage. A potential difference is formed between the pixel electrode 180 and the transparent electrode 220 according to a voltage applied to the pixel electrode 180 by a thin film transistor 101 (refer to FIG. 4) as a switching element.

An electrophoretic microcapsule 230 is disposed between the pixel electrode 180 and the transparent electrode 220. The microcapsule 230 includes a capsule shell 231, an electrophoretic particle 232, and a dispersion medium 233. The electrophoretic particle 232 may be positively charged or negatively charged.

If the pixel electrode 180 and the transparent electrode 220, which face each other, receive a voltage and form a potential difference (+,−) therebetween, the electrophoretic particle 232 moves vertically to the electrode 180 or 220 having opposite polarity.

In this case, a user may see light that is incident and reflected by the electrophoretic particle 232. If the electrophoretic particle 232 moves upward, the user may easily see the color of the electrophoretic particle 232. If the electrophoretic particle 232 moves downward, the user may not be able to see the color the electrophoretic particle 232.

The electrophoretic particle 232 moves through electrophoresis in which particles having a surface charge move toward an electrode having an opposite electric charge within an electric field.

With the foregoing principle, the display device 900 displays an image thereon using electrophoresis.

Figure 6:
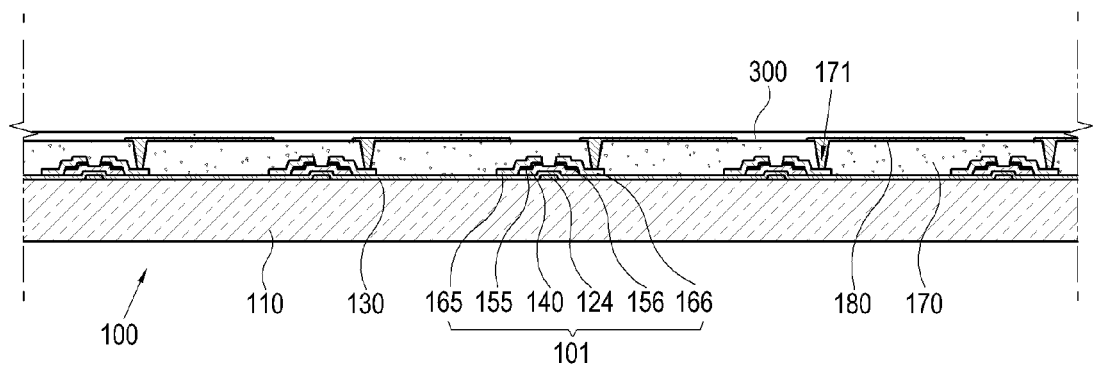
FIG. 6 and FIG. 7 are cross-sectional views showing a manufacturing method of the display device in FIG. 4.
Figure 7:
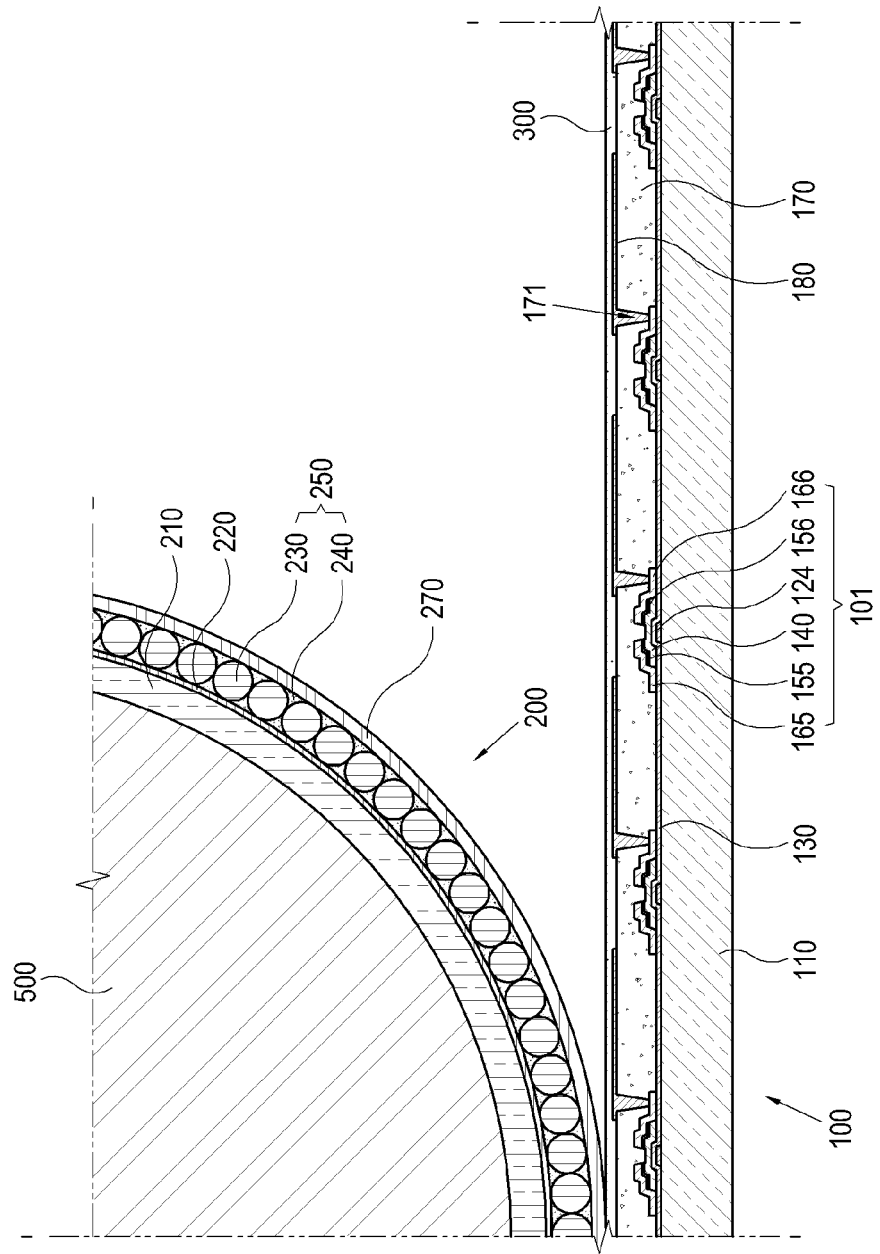

Referring to FIG. 6 and FIG. 7, a method of manufacturing the display device 900 in FIG. 4 will be described.

As shown in FIG. 6, the panel unit 100 including the thin film transistor 101 and the pixel electrode 180 is provided. The panel unit 100 is not limited to that in FIG. 6 and may be formed in various ways.

Then, the inter-unit adhesive layer 300 is coated on the pixel electrode 180 of the panel unit 100, but is not limited thereto. Alternatively, the inter-unit adhesive layer 300 may be formed on the electrophoretic display unit 200 (to be described later) or on both the panel unit 100 and the electrophoretic display unit 200.

As shown in FIG. 7, the electrophoretic display unit 200 in FIG. 1 is adhered to the panel unit 100 using a roller 500. Here, the electrophoretic protection layer 270 of the electrophoretic display unit 200 faces the pixel electrodes 180 of the panel unit 100 and the inter-unit adhesive layer 300 is positioned therebetween.

The electrophoretic display unit 200 may be rolled on the roller 500 or just rolled on itself, but is not limited thereto.

Alternatively, the electrophoretic display unit 200 may be unrolled when it is disposed on the panel unit 100 and may be adhered thereto by pulling the electrophoretic display unit 200 using a roller.

The electrophoretic display unit 200 may have a thickness ranging from 20 μm to 200 μm. If the electrophoretic display unit 200 is thinner than 20 μm, it may be wrinkled when it is adhered to the panel unit 100. If the electrophoretic display unit 200 is thicker than 200 μm, it may be difficult to roll up and move the electrophoretic display unit 200 or adhere the electrophoretic display unit 200 to the panel unit 100.

With the foregoing manufacturing method, the display device 900 having improved stability, productivity, and display properties may be manufactured.

Referring to FIG. 8, a display device 901 according to a fourth exemplary embodiment of the present invention will be described.

As shown therein, the display device 901 includes a panel unit 100 and an electrophoretic display part 202 that is formed on the panel unit 100.

The panel unit 100 according to the fourth exemplary embodiment is same as that shown in FIG. 4.

The electrophoretic display part 202 includes an electrophoretic protection layer 270, a wall member 290, an electrophoretic particle 236, a dispersion medium 237, a sealing layer 225, a common electrode 220, and a transparent substrate member 211. Here, the transparent substrate member 211 may include an insulating substrate, such as glass, or a transparent base film.

The electrophoretic protection layer 270 may be opaque and is formed on the pixel electrodes 180 of the panel unit 100. The electrophoretic protection layer 270 may be substantially black or white.

The electrophoretic protection layer 270 is formed on at least two pixel electrodes 180. That is, the electrophoretic protection layer 270 is not separately formed on each pixel electrode 180.

The wall member 290 is formed on the electrophoretic protection layer 270 and separates each space above pixel electrodes 180. That is, the wall member 290 includes accommodators 291 that are formed above respective pixel electrodes 180 to accommodate the electrophoretic particles 236 and the dispersion medium 237 therein. Microcup$^{TR}$, which is manufactured by SIPIX, may be used as the wall member 290.

The electrophoretic particles 236 and the dispersion medium 237 are accommodated in the accommodators 291 of the wall member 290.

The sealing layer 225 is sealed to the wall member 290 and prevents the electrophoretic particles 236 of one accommodator 291 from moving to another accommodator 291. The sealing layer 225 may include a polymer material.

The common electrode 220 forms an electric field with the pixel electrodes 180 of the panel unit 100, thereby moving the electrophoretic particles 236 disposed in the accommodators 291 of the wall member 290.

An additional adhesive layer (not shown) may be formed between the pixel electrodes 180 of the panel unit 100 and the electrophoretic protection layer 270.

With the foregoing configuration, the display device 901 may have improved display properties.

That is, the display device 901 may assign a particular color to the electrophoretic protection layer 270, which may improve the quality of an image displayed thereon.

As described above, exemplary embodiments of the present invention provide an electrophoretic display unit that may have improved stability, productivity, and display properties.

That is, the electrophoretic display unit includes an electrophoretic protection layer that protects an electrophoretic display layer from being damaged, which may improve stability.

Because a particular color is assigned to the electrophoretic protection layer, the quality of an image displayed on the electrophoretic display unit may be improved. More specifically, the contrast ratio and/or brightness may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
   a panel unit comprising a thin film transistor (TFT) and a pixel electrode; and
   an electrophoretic display unit disposed on the panel unit, the electrophoretic display unit comprising:
   an opaque electrophoretic protection layer disposed on the pixel electrode of the panel unit;
   an electrophoretic display layer disposed on the opaque electrophoretic protection layer;
   a transparent electrode disposed on the electrophoretic display layer; and
   a transparent base film disposed on the transparent electrode,
   wherein the electrophoretic protection layer protects the electrophoretic display layer before the electrophoretic display unit is disposed on the panel unit.

2. The display device of claim 1, further comprising an inter-unit adhesive layer disposed between the pixel electrode of the panel unit and the electrophoretic protection layer of the electrophoretic display unit.

3. The display device of claim 1, wherein the electrophoretic protection layer comprises at least one of an inorganic pigment and an organic pigment.

4. The display device of claim 3, wherein the electrophoretic protection layer is substantially black.

5. The display device of claim 1, wherein the electrophoretic protection layer comprises at least one of titanium dioxide, barium sulfate, zinc oxide, basic lead carbonate, aleurone, mica, and crystal powder.

6. The display device of claim 5, wherein the electrophoretic protection layer is white.

7. The display device of claim 1, wherein the electrophoretic protection layer comprises a polymer material.

8. The display device of claim 1, wherein the electrophoretic protection layer is consecutively formed on at least two pixel electrodes.

9. The display device of claim 1, further comprising an adhesive layer disposed between the electrophoretic display layer and the electrophoretic protection layer.

10. A method of manufacturing a display device, comprising:
    providing a panel unit comprising a thin film transistor (TFT) and a pixel electrode;
    providing an electrophoretic display unit comprising a transparent base film, a transparent electrode disposed on the base film, an electrophoretic display layer disposed on the transparent electrode, and an opaque electrophoretic protection layer disposed on the electrophoretic display layer; and
    adhering the electrophoretic display unit to the panel unit,
    wherein the electrophoretic protection layer protects the electrophoretic display layer before the electrophoretic display unit is adhered to the panel unit.

11. The method of claim 10, further comprising applying an adhesive layer on at least one of the pixel electrode of the panel unit and the electrophoretic protection layer of the electrophoretic display unit.

* * * * *